May 12, 1959
C. A. COUTTS
2,885,892
INFLATABLE INSPECTION DEVICE
Filed Jan. 24, 1958
2 Sheets-Sheet 1
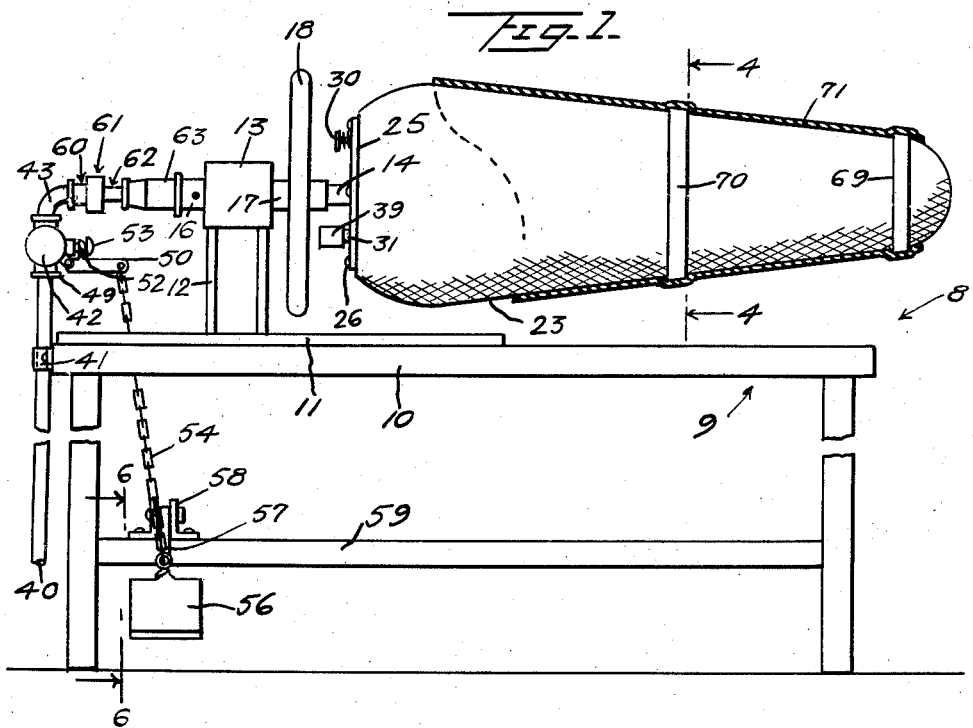
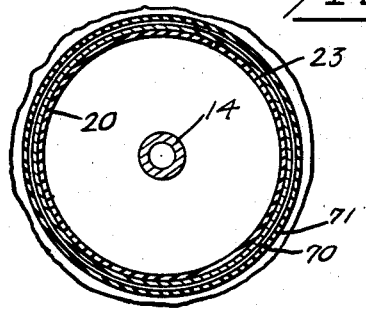
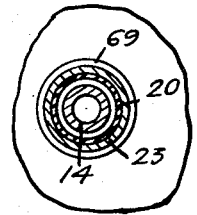
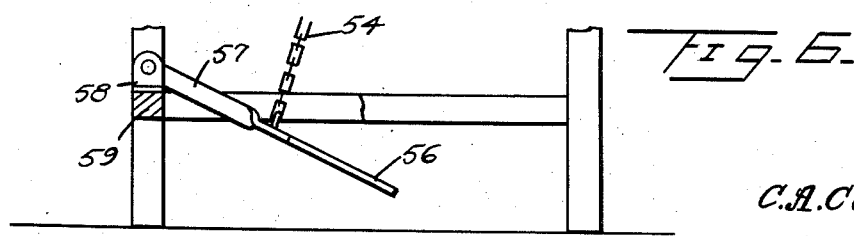
INVENTOR
C. A. Coutts
BY John N. Randolph
ATTORNEY May 12, 1959
C. A. COUTTS
2,885,892
INFLATABLE INSPECTION DEVICE
Filed Jan. 24, 1958
2 Sheets-Sheet 2
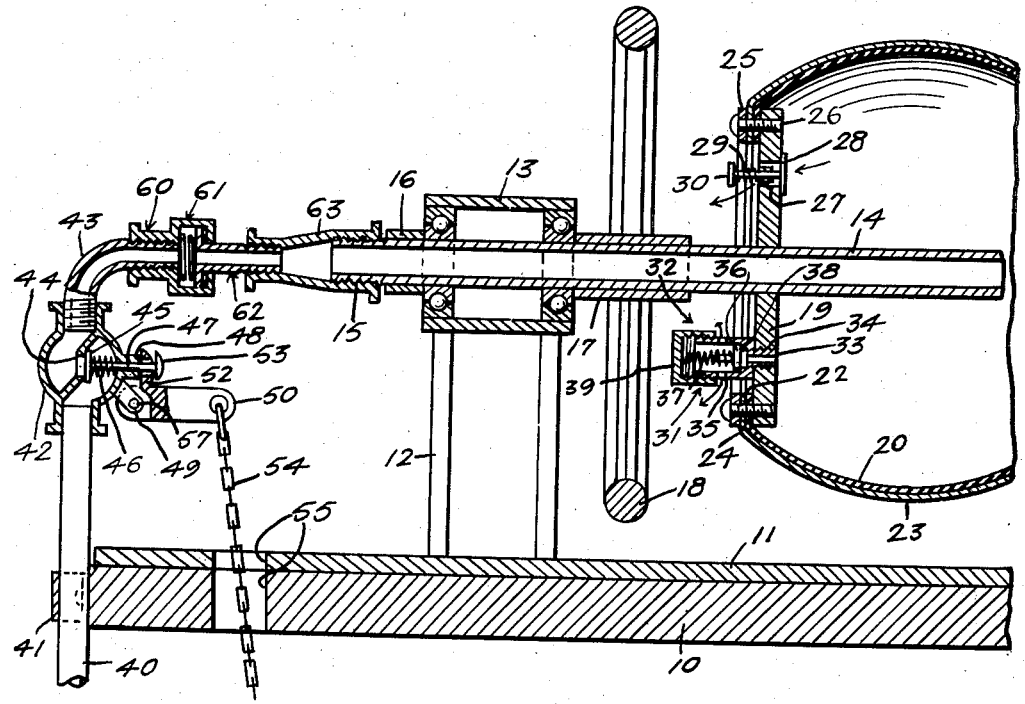
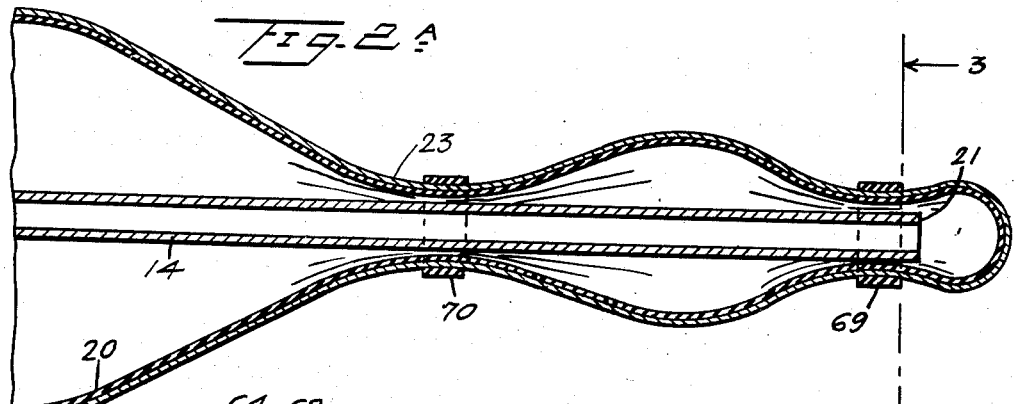
INVENTOR
C. A. Coutts
BY John N. Randolph
ATTORNEY United States Patent Office 2,885,892
Patented May 12, 1959

2,885,892
INFLATABLE INSPECTION DEVICE

Charles A. Coutts, Minneapolis, Minn., assignor to Charleston Rubber Company, Charleston, S.C., a corporation of Ohio Application January 24, 1958, Serial No. 711,047

12 Claims. (Cl. 73—159)

This invention relates to a novel device or apparatus by means of which rubber sleeves can be expanded and revolved for visual inspection of the sleeves for locating defects which are visible only when the sleeves are distended.

More particularly, it is an aim of the present invention to provide an apparatus of extremely simple construction on which a rubber sleeve, such as a lineman's protective sleeve, may be quickly applied, stretched and revolved while stretched for visually locating defects therein.

A further object of the invention is to provide an apparatus including a mandrel on which the sleeve is supported and by means of which the sleeve is stretched or distended.

A further object of the invention is to provide an inspection device having novel means for expanding and contracting the mandrel to facilitate applying rubber sleeves thereto and removing rubber sleeves therefrom.

Various other objects and advantages of the invention will hereinafter become more fully apparent from the following description of the drawings, illustrating a presently preferred embodiment thereof, and wherein:

Figure 1 is a side elevational view of the inspection device showing the mandrel inflated and with a rubber sleeve, shown in longitudinal section, mounted thereon;

Figure 2 is an enlarged fragmentary longitudinal sectional view of one end of the inspection device;

Figure 2A is a similar view of the other end of the inspection device and showing the mandrel deflated;

Figure 3 is a cross sectional view, taken substantially along a plane as indicated by the line 3—3 of Figure 2A;

Figure 4 is an enlarged cross sectional view, taken substantially along a plane as indicated by the line 4—4 of Figure 1;

Figure 5 is an enlarged fragmentary longitudinal sectional view of a part of the apparatus, and Figure 6 is a fragmentary vertical sectional view, taken substantially along a plane as indicated by the line 6—6 of Figure 1.

Referring more specifically to the drawings, the inflatable inspection device in its entirety is designated generally 8 and includes an elongated table 9 having a table-top 10.

A base plate 11 is mounted on and secured to one end of the table-top 10 and is provided with an upstanding standard 12 which supports a bearing 13 at the upper end thereof. A portion of a hollow shaft or pipe 14 extends through and is journaled in the bearing 13. The pipe or shaft 14 is supported by the bearing 13 above the table-top 10 with its axis substantially parallel to the plane of said table-top. One end of the hollow shaft or pipe 14 terminates beyond or adjacent the end of the table-top 10 which is located remote from the bearing 13. The other shorter end of the shaft or pipe 14 extends only a short distance from the bearing 13, toward the adjacent end of the table-top 10 and has an externally threaded terminal portion 15. A collar 16 is detachably secured to the shaft or pipe 14, between said terminal portion 15 and the adjacent end of the bearing 13. The hub 17 of a handwheel 18 is secured to the shaft or pipe 14, beyond the opposite end of the bearing 13, and adjacent ends of said hub and the collar 16 bear against the ends of the bearing 13 to prevent sliding movement of the hollow shaft in the bearing.

A metal disc 19 is mounted concentrically around and secured immovably to the hollow shaft 14 adjacent the other outer end of the hub 17. An elongated rubber or inflatable bladder or sack 20 is disposed loosely over the portion of the hollow shaft 14 which extends from the disc 19 in a direction away from the handwheel 18, and said bladder or sack 20 has a closed end disposed beyond and spaced from the end 21 of the hollow shaft 14, which is located remote from the bearing 13. The other open end 22 of the sack or bladder 20 engages around the periphery of the disc 19 and bears against the marginal portion of the side thereof which faces the handwheel 18. An elongated nonelastic bag or sack 23, which is preferably formed of canvas, is disposed over the inflatable bladder 20 and has an open end 24 which overlies the open end 22 of the bladder, as best seen in Figure 2. A metal ring 25 is disposed against said open end 24 of the sack 23 and a plurality of screw fastenings 26 extend through the ring 25 and the portions 24 and 22 and are threadedly anchored in the disc 19 for clamping said open ends 22 and 24 of the bladder 20 and sack 23, respectively, to the disc 19 and so as to form an airtight seal between the disc 19 and bladder 20.

An air escape port 27 is formed in the disc 19 and is normally maintained closed by a valve 28, which is slidably mounted in the disc 19 and which is urged outwardly and to a closed position by a valve spring 29. The stem of the valve 28 has a head or enlargement 30 at its outer end forming a stop for one end of the spring 29 and a button by means of which the valve 28 can be displaced inwardly to an open position. A relief valve, designated generally 31, includes a valve housing 32 having a hollow externally threaded neck 33 at one end thereof which is mounted in and extends threadedly through a threaded opening 34 of the disc 19. The valve housing is supported by its neck portion 33 externally of the disc 19 and is provided with outlet ports 35. A valve 36 is mounted in the housing 32 and is urged by a valve spring 37 against a valve seat 38 of the housing, which is located between the hollow neck 33 and the outlet ports 35, to normally prevent escape of air outwardly through the ports 35. The outer end of the valve housing 32 is closed by a threaded adjustably mounted cap 39 which provides an adjustable stop for one end of the spring 37, to vary the tension of said spring and the amount of air pressure required to open the valve 36 to permit escape of air through the ports 35.

An upwardly extending portion of a conduit 40, leading from a source of compressed air, not shown, is secured by a clamp member 41 to the end of the table-top 10, located adjacent the standard 12. One end of a valve housing 42 is connected to the outlet end of the conduit 40, which is located above and adjacent the clamp 41, and one end of an elbow conduit 43 is connected to the other upper end of the valve housing 42. The valve housing 42 is provided with a restricted passage and valve seat 44 located between the ends thereof, to which the conduit ends 40 and 43 are connected, which is normally closed by a valve 45, which is urged to a closed position by a valve spring 46. The spring 46 is mounted on the valve stem 47 which extends slidably through and outwardly from a guide portion 48 of the housing 42. The valve housing 42 has a downwardly extending apertured ear 49, located beneath the guide 48, to which one end of a lever 50 is pivotally connected by a pivot element 51, for vertical swinging movement. The lever 50, adjacent its pivoted end, has an upwardly extending apertured arm 52 through which an outer portion of the valve stem 47 loosely extends. A head 53 is connected to the outer end of the valve stem 47 and is disposed outwardly with respect to the arm 52.

A flexible element or chain 54 has one end connected to the outer end of the lever 50 and extends downwardly therefrom loosely through aligned openings 55 of the plate 11 and table-top 10. A foot pedal 56, as seen in Figures 1 and 6, has an extension 57 at one end thereof the terminal of which is pivotally connected to a bracket 58 which is mounted on a longitudinal brace 59 of the table 9, so that the pedal 56 and its extension 57 are disposed crosswise of the longitudinal axis of the table and extend downwardly and inwardly thereof from the bracket 58. The opposite end of the chain 54 is connected to the extension 57, remote from the bracket 58.

A stationary end 60 of a swivel joint 61 is connected to the opposite end of the elbow conduit 43 and is supported thereby in alignment with the hollow shaft 14. The other swivelly mounted tubular end 62 of the hollow swivel joint 61 is connected to a restricted end of a reducer conduit 63, the enlarged end of which is connected to the threaded pipe end 15. As best seen in Figure 5, the stationary part 60 of the swivel joint includes a box-like end 64 which is disposed beyond the last mentioned end of the elbow conduit 43 and which has an opening 65 in its outer wall in which a part of the section 62 is rotatably mounted. The section 62 includes a flanged inner end 66 which is contained in the box portion 64. A spring 67, contained in the box portion 64, urges the flange 66 against a sealing washer 68 which is mounted within the box portion 64 on the section 62 and between said flange 66 and the end wall of the box 64 in which the opening 65 is formed, to prevent escape of air from the swivel joint 61 through the opening 65.

Two endless elastic bands 69 and 70 are mounted around the nonelastic sack or bag 23, as seen in Figures 1 and 2A. The band 69 is located near the closed ends of the bladder 20 and sack 23 and adjacent the discharge end 21 of the pipe 14, and the band 70 is located substantially midway of the ends of the sack and bladder.

The elastic bands 69 and 70 normally maintain the bladder 20 and sack 23, which constitute an inflatable mandrel, deflated and constricted as seen in Figures 2 and 2A so that the conventional rubber sleeve 71, such as a lineman's protective sleeve, can be readily applied over the collapsed but longitudinally extended mandrel 20, 23. An operator, not shown, disposed at the side of the table 9 so as to face the apparatus as seen in Figure 1, by then exerting a downward pressure with the foot against the pedal 56 will rock the lever 50 downwardly for opening the valve 45 so that compressed air can be supplied through the valve housing 42 from the conduit 40, through the conduit 43, swivel joint 61, reducer 63 and hollow shaft 14 to the bladder 20 for inflating said bladder to distend or stretch the rubber sleeve 71. The nonelastic covering 23 of the bladder 20 limits the extent that the bladder can be distended or inflated and also governs the shape of the inflated mandrel 20, 23, as seen in Figure 1. After the mandrel has been inflated to stretch the sleeve 71, the operator revolves the mandrel and sleeve by turning the handwheel 18 for causing the shaft 14 to revolve in the bearing 13, so that the distended sleeve 71 can be inspected for defects by visual inspection as it is revolved with the mandrel. The operator then presses against the button 30 to open the valve 28 to allow the air to escape from the inflated mandrel through the port 27 and so that the elastic bands 69 and 70 can constrict the mandrel, as seen in Figures 2 and 2A. It will be readily apparent that the sleeve 71 can be easily removed from the deflated and constricted mandrel and another sleeve to be inspected readily applied. The hollow shaft 14 by extending to adjacent the closed outer end of the mandrel 20, 23 maintains said mandrel longitudinally extended when deflated, as seen in Figure 2A, so that the rubber sleeves can be most conveniently applied thereto or removed therefrom.

It will be understood that pressure on the foot pedal 56 is removed as soon as the mandrel is inflated, to allow the spring 46 to close the valve 45 to shut off the flow of compressed air to the mandrel and so that the mandrel can thereafter be deflated by opening the valve 28. However, should the mandrel be over-inflated the relief valve 31 is set to open to release any excess pressure therefrom automatically.

It will also be readily obvious that the lever 50 can be operated manually in which case the foot pedal 56 and chain 54 could be dispensed with.

Various modifications and changes are contemplated and may be resorted to, without departing from the function or scope of the invention as hereinafter defined by the appended claims.

I claim as my invention:

1. An inspection device comprising an elongated inflatable mandrel on which an elastic sleeve member to be visually inspected is adapted to be detachably mounted, means for supporting said mandrel, a journal member rotatably mounting said means, said mandrel supporting means including a conduit having a discharge end opening into the mandrel and an opposite inlet end disposed externally of the mandrel, a conduit for supplying air under pressure connected to the inlet end of the conduit portion of said mandrel supporting means, said air pressure supply conduit including a swivel joint, a valve interposed in the air pressure supply conduit for regulating the supply of air to the mandrel, and a release valve for releasing the air from the inflated mandrel, said release valve being mounted in a part of said mandrel supporting means.

2. An inspection device as in claim 1, said rigid mandrel supporting means including a hollow shaft forming said conduit portion thereof, said hollow shaft extending substantially from end-to-end of the mandrel, a disc forming a part of the mandrel supporting means fixed to said hollow shaft and to which an end of the mandrel is connected, said mandrel having an opposite closed end, and said hollow shaft having a discharge end located adjacent said closed end of the mandrel.

3. An inspection device as in claim 2, said release valve being mounted in said disc.

4. An inspection device as in claim 3, and an automatic excess pressure release valve mounted in said disc for automatically releasing excess pressure from the inflated mandrel.

5. An inspection device as in claim 4, and elastic members mounted on the mandrel adjacent its closed end and approximately intermediate of its ends for collapsing the mandrel when deflated to facilitate applying the rubber sleeve to the mandrel and removal of the rubber sleeve therefrom.

6. An inspection device as in claim 1, said mandrel comprising an elongated nonporous elastic bladder and an elongated nonelastic sack enclosing said bladder for limiting the extent that the bladder is distended when inflated and for controlling the shape of the inflated mandrel.

7. An inspection device as in claim 6, and constricting means engaging longitudinally spaced portions of the mandrel for restricting the mandrel when deflated to facilitate application of the sleeve and removal of the sleeve.

8. An inspection device as in claim 1, and a handwheel secured to the mandrel supporting means beyond an end of the mandrel for revolving said supporting means and the mandrel manually.

9. An inspection device comprising an elongated inflatable mandrel, means supporting said mandrel for rotation about its longitudinal axis, air pressure supply means, said supporting means including a conduit portion having a part connected to said air pressure supply means and another part opening into the mandrel for inflating the mandrel, said mandrel being adapted to support an elastic sleeve for visual inspection when the sleeve is stretched by inflation of the mandrel and revolved therewith, a manually operated valve interposed in said means for supplying air under pressure for regulating the flow of air to the mandrel, and a manually actuated valve interposed in a part of said mandrel supporting means for releasing the air pressure from the mandrel.

10. An inspection device as in claim 9, and constricting means connected to longitudinally spaced portions of the mandrel for constricting the deflated mandrel to facilitate application and removal of the sleeve.

11. An inspection device as in claim 9, said conduit portion including a rigid part extending substantially from end-to-end of the mandrel for maintaining the mandrel extended longitudinally when deflated.

12. An inspection device as in claim 9, said mandrel including an outer nonelastic ply and an inner elastic nonporous ply forming a bladder, said outer nonelastic ply limiting the extent that the bladder can be distended and defining the shape of the inflated mandrel.

References Cited in the file of this patent

UNITED STATES PATENTS

| | | |
|---|---|---|
| 1,990,013 | Albrecht | Feb. 5, 1935 |
| 2,662,400 | Weiner et al. | Dec. 15, 1953 |
| 2,811,291 | Levinson | Oct. 29, 1957 |